June 5, 1945.  J. T. STONE  2,377,844
CUTTING AND BEVELING MACHINE
Filed May 7, 1943  3 Sheets-Sheet 1

Inventor
JOHN T. STONE.
By Howard J. Whelan.
Attorney

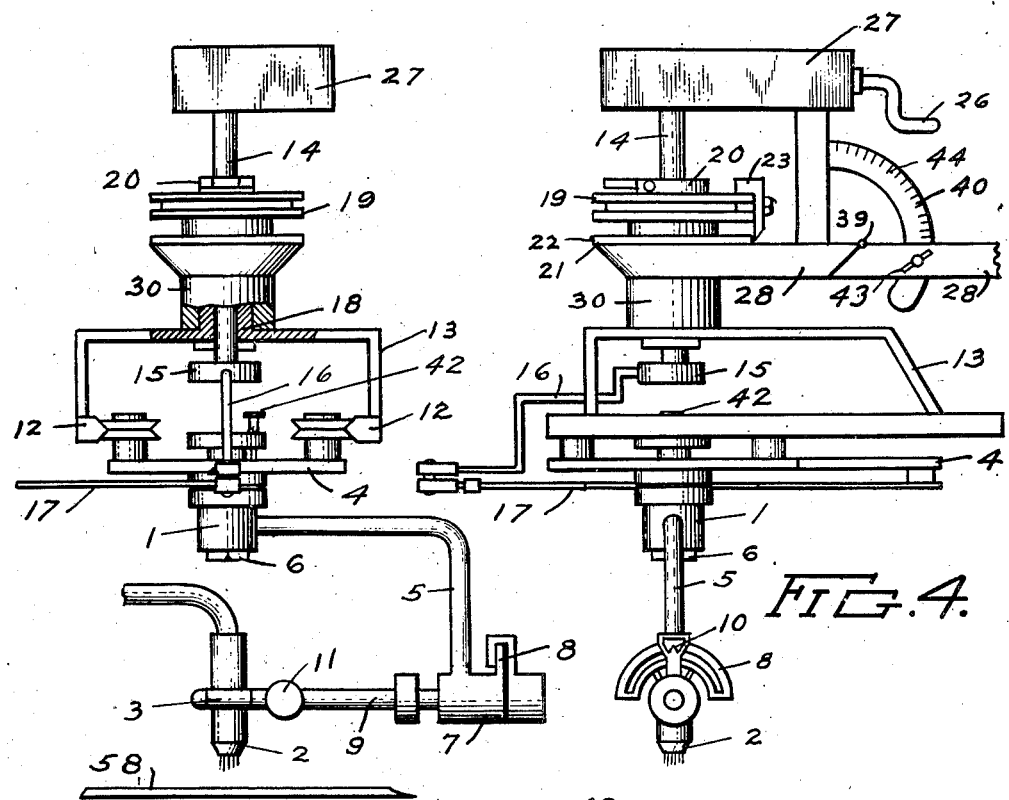
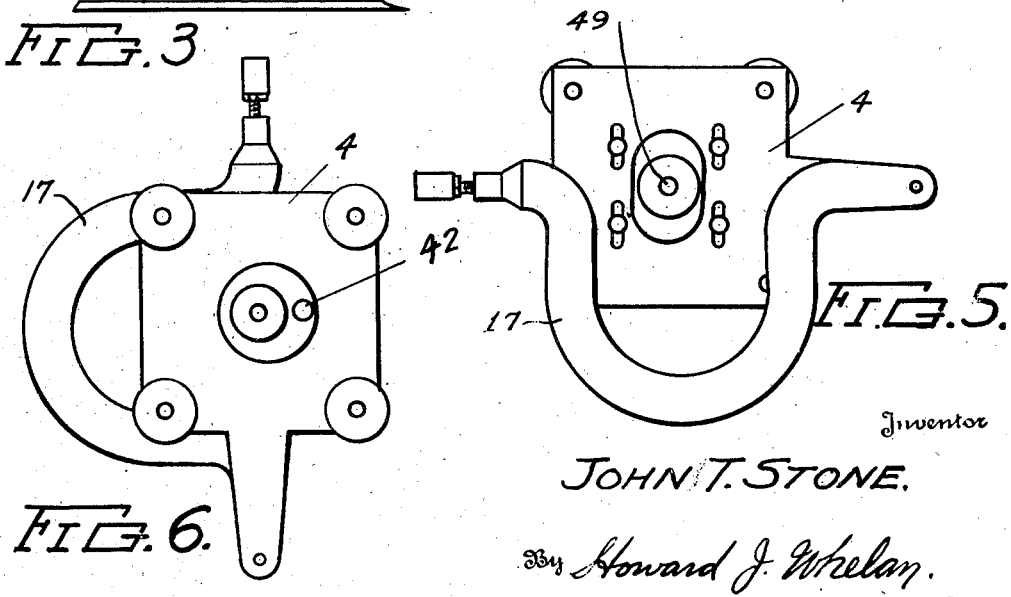

June 5, 1945.　　　　J. T. STONE　　　　2,377,844
CUTTING AND BEVELING MACHINE
Filed May 7, 1943　　　　3 Sheets-Sheet 3

Inventor
JOHN T. STONE
By Howard J. Whelan.
Attorney

Patented June 5, 1945

2,377,844

UNITED STATES PATENT OFFICE 2,377,844

CUTTING AND BEVELING MACHINE

John T. Stone, Baltimore, Md.

Application May 7, 1943, Serial No. 486,097

2 Claims. (Cl. 266—23)

This invention refers to welding equipment and more particularly to a burner device for cutting out variable shapes in metal or other rigid materials. It has among its objects to provide a burner device of the gas or electric type that can be operated through suitable mechanism to carry the cutting flame or arc through a predetermined path giving the desired contour thereto for the work selected to be done by it. Another object is to provide suitable adjustability to the parts to permit them to locate and position the burner in any desirable plane or location with respect to the metal to be acted upon. A further object is to have the burner operate quasi-automatically when once set for the work in question. A still further object is to provide a device of this nature that will be portable and adapted to cover a considerable field of uses, and yet have a structure that will be relatively simple, convenient to handle and efficient in operation. Still another object is to afford the operator a visual opportunity to observe the manner in which the device is doing its work during operation.

Other objects will become apparent as the invention is more full set forth.

The particular features characteristic of this invention are in its unique operation and manner of setting the burner to operate through a large selection of movements suitable for the various types of holes to be cut or pieces of metal furnished. The device uses a unique method of adjusting the sizes and types of holes or pieces to be made. It utilizes a graduated scale and a dog or gimmick to operate it in the prescribed manner.

In the drawings which illustrate an embodiment of this invention:

Figure 3 is an end elevation of the device shown in Figure 1;

Figure 4 is a rear elevation of the device shown in Figure 1;

Figure 5 is an underview of the carriage showing the link mechanism used in this device;

Figure 6 is a plan view of the carriage shown in Figure 5;

Figure 9:
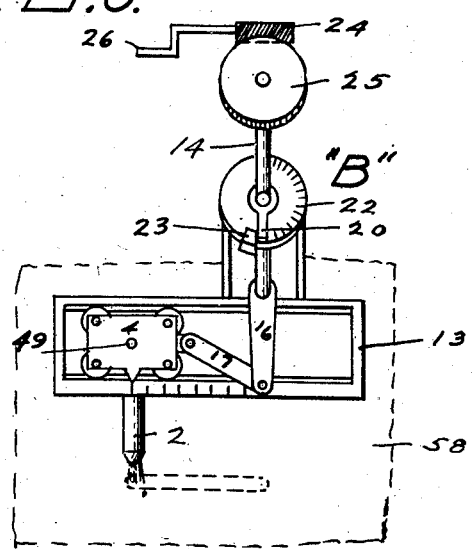
Figure 10:
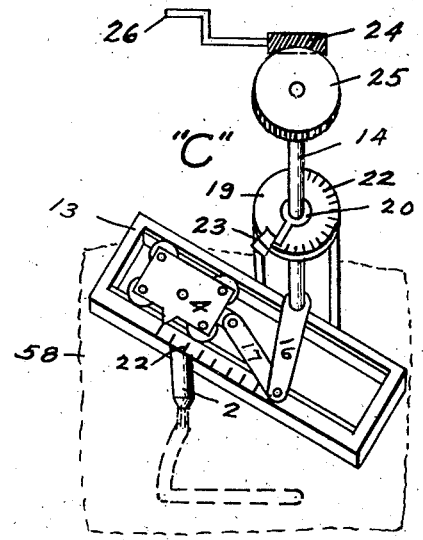

Figure 9 shows diagram "B" which illustrates the carriage at the end of its straight travel, and establishes the radius to be cut, the regulating bracket and marker are contacting each other, further turning of the crank will rotate the carriage and burner in a circular manner and cut the plate accordingly; and Figure 10 shows diagram "C" which shows the effects of moving the carriage out in a straight line until the predetermined radius has been reached, it is then rotated in a circular manner until the complete circle has been cut, in this instance the circle has been cut for a distance of thirty degrees, in addition to the burning from the center out to the radius.

Similar reference characters refer to similar parts throughout the drawings.

The device consists of a burner holder 1, having an electric arc, oxyacetylene or other high temperature flame producer means 2, extended from the end portion 3 of same. This holder is of suitable form, as indicated in the drawings, so as to hold the burner proper, effectively. The holder 1 is mounted underneath on a carriage 4 and is rotatable therein on its axis when the pin 42 is disengaged as shown in Figure 3. This allows the cutting of holes without twisting the cables or hoses. The holder has an arm 5 bent into an L-shape which can move freely around in a circle about the axis mentioned until locked in any selected position by the nut 6. A sleeve 7 is attached rigidly to the lower end portion of the arm 5 and positioned in a horizontal plane. An indicator 8 is mounted on this sleeve and serves to show the angle of the shank 9 holding the burner 2 with respect to the vertical, through the use of a pointer 10. This pointer is mounted on the shank 9 and moves around with same as the latter is turned in the sleeve. A clamping screw 11 secures the burner to the shank 9, and holds it rigid. The turning of the shank determines whether the burner shall point downwardly or angularly to the perpendicular. The mechanism supporting the carriage is of a peculiar type and will be explained later. It can be stated however that it gives the carriage a reciprocating travel on tracks 12 which are supported on frame 13, which is held rigid in relation to a rotating support 18 which forms a part of the gauge plate 19, and is moved thereby. A spindle 14 forms the central element on which the mechanism of the device operates. The first item on the spindle is a collar 15 that is so fastened as to rotate with it. When this collar rotates, it pushes the mechanism that moves the carriage back and forth on the tracks. This mechanism consists of a series of links 16 and 17, respectively that operate as shown in the diagram. The position of the carriage from the center of the spindle determines the radius the burner is set to cut. The amount of rotation of the collar is regulated by another part securely fastened to the spindle and known as the regulating bracket 20. It is preferably placed above the gauge and travels over same, an indicating plate 21 that is stationary on the frame and indexed or graduated in degrees 22 as shown. A limit-stop marker 23 is adjustably mounted on the guage plate and after being set serves to obstruct the bracket, when it is turned sufficiently, to contact it. After the bracket 20 has reached the marker 23, and the burner has been made to travel in a direction from the spindle, its distance corresponding thereto, the operation changes. The continued turning of the spindle (in the same direction) now causes the regulating bracket 20 to force the marker 23 and everything tied to it mechanically to move with it in a circumferential or arcuate direction with the spindle as center. The frame 13 is turned, the tracks are moved with the frame 13, and the carriage is carried along with the tracks in the arcuate direction without changing their relative position with regard to each other. The burner is carried on the carriage and being fastened to it moves in the same general direction. This is the simplest operation of the device. However, to rotate the spindle on its axis, a worm 24 and worm gear 25 operated through a crank 26 serve to permit this action when the operator turns the crank 26. A frame 27 supports the crank 26 and worm gear 25 and holds them attached to the radial arm 28. The arm 28 has the spindle 14 journalled at 29 in sleeve 30, which has its upper portion 31 adapted to retain the worm gear 25 in position thereon. A portion of the radial arm supports the frame 13 attached to it. The radial arm terminates in a union 32 that serves to hold it removably to an adjustable extension 35 on the barrel 33 of a stand 34. This extension member is manipulated through a screw, threaded bolt 36 connected with it. The union is provided with bolts 45 and graduations 46. The member 36 turns in a screw-threaded sleeve 37 formed in the stand, when the handle 38 is rotated. This raises or lowers the bolt and extension member to a suitable height selected. The stand is placed on a suitable table or the like 58 to maintain it in a vertical position. The extension member and the connecting arm may be swung around to any circumferential position about the stand. Thus the burner may be given a composite travel affected by the movement of the radial arm; the spindle rotation; and the bracket-stop action, and the angle of the shank 9.

The radial arm is split and hinged at 39 to allow the portion holding the spindle burner, etc., to be swung from a vertical to a horizontal position and intermediately for any purposes whatever: These purposes may be for lighting the burner or giving it an angular disposition. The protractor beam 40 passes through a hole 41 in the arm to permit this adjustment or hinge movement and is set by a thumb screw 43 attached to the arm. The beam is suitably graduated in degrees 44 to show the amount of tilt given the burner through the use of the hinged joint 39. The form of the joint 39 is as indicated, to keep the radial arm horizontal in its normal position.

The operation of the device is as follows: The device is carried with stand and burner complete to the work to be done. This may be on a table; on the ground or in place. The stand is fastened to the work or set thereon. The contour of diameter of the cut to be made is determined, and the regulating bracket 20 and limit stop marker 23 are set accordingly. A center punch is placed in hole 49 and centers the hole to be burned in the plate with the carriage. The electric or gas-flame burner point is then pointed directly at some selected point on the material. This point is usually away from the contour line so as to avoid excessive expansion stresses and strains in the material at the beginning and incidental distortion of the plate. The burner is started and proceeds to burn a hole in the material at the point selected.

Then the first cut is made by turning the crank 26 which operates the mechanism links 16 and 17, and carries the burner away from the point in a straight line until it reaches another point determined by the contacting of the regulating bracket 20 and the marker 23. Then the operation of the mechanism is obstructed, by this contacting and causes the whole carriage, burner and incidental parts connected therewith to move together in an arcuate manner instead. In the present instance, the burner is carried through the contour of a circle having the starting point mentioned above, as the center, and the last point of the initiating travel as the end of the radius. The changing of the position of the marker changes the size of diameter of the circle to be cut. The adjustments are made by utilizing the features of the hinged joint; the extension member; the stand bolt and sleeve; and the holder shank. The operation of the crank 26 alone is usually sufficient for circles, but where the cut is to be of broader scope the radial arm is also swung at the same time to carry the burner through a different cutting contour.

Figure 1:
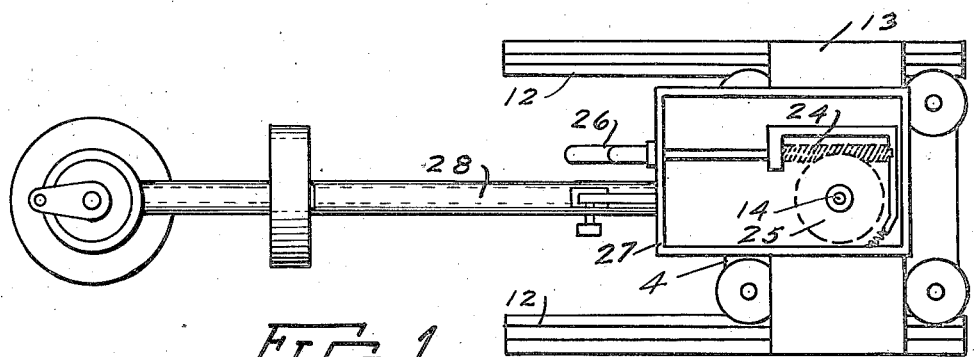
Figure 1 is a plan view of a cutting and beveling machine embodying this invention.
Figure 2:
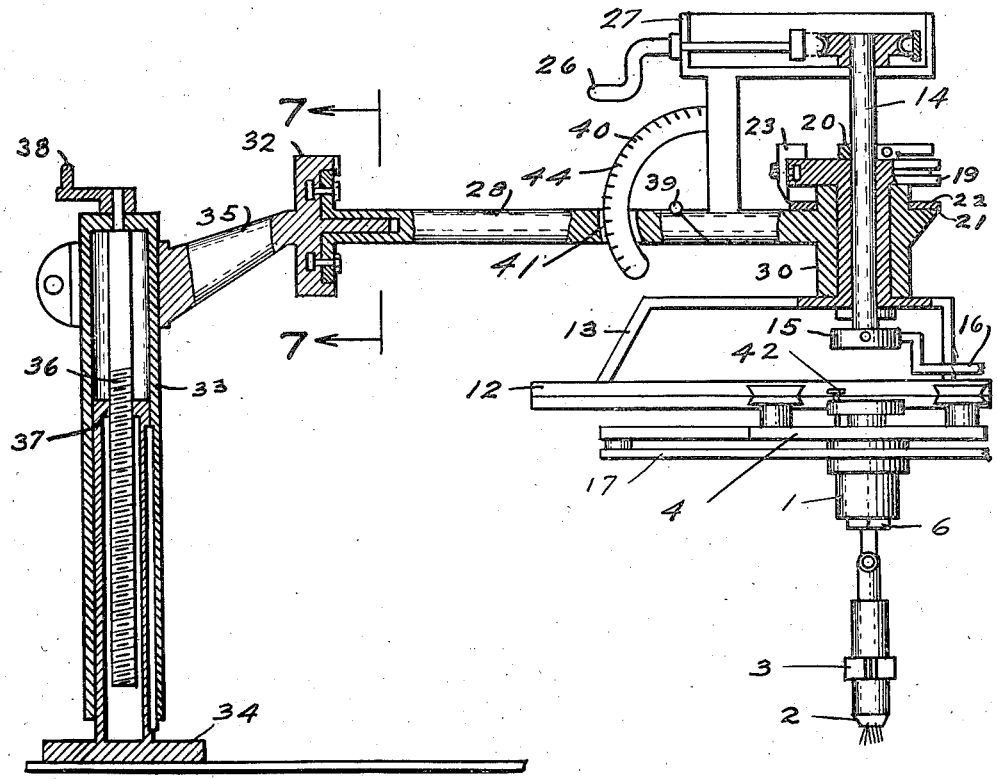
Figure 2 is a side elevation partly in section, of the device shown in Figure 1.
Figure 7:
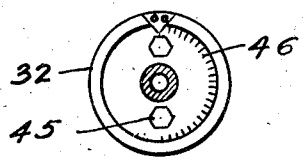
Figure 7 is a view of the union taken along line 7—7 of Figure 2.
Figure 8:
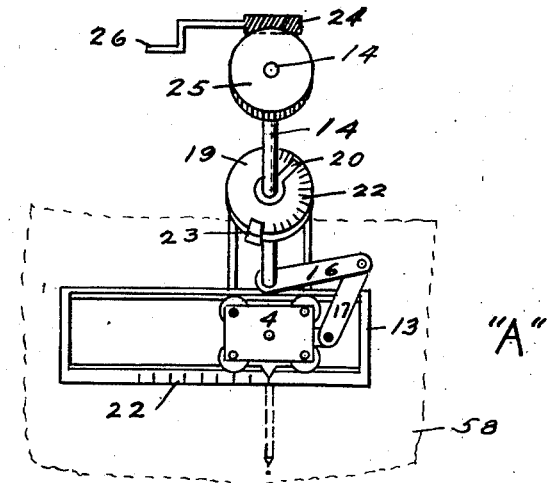
Figure 8 shows a diagram called "A," which represents the carriage holding the burner in its initial position over the plate and aligned with the center of the hole to be burned, it also shows the regulating bracket and marker set in the relative positions required to allow the carriage to travel its predetermined distance in a straight line before it starts to rotate in a circular manner.

The diagrams are provided in the drawings to make the operation clearer. They do not necessarily follow the actual construction referred to previously, since some of the parts are partially concealed by one another and are somewhat hard to follow in their movements. The open form in the diagrams indicates all the parts fundamentally involved in the principles of the device and serves to show the functions in proper sequence. Thus in Figure 8 the carriage holding the burner is in its initial position over the plate, and is under the spindle and in line with the axis of the latter. The frame and rails hold the carriage in its position. The links indicated are in their initial position and are ready to move the carriage when operated through the spindle. The indicating plate is ready to be marked off with the marker 23. For example, the marker is placed at the "2" diameter mark on the gauge 19, so the burner will cut a disc out of the work plate to make a hole "2" in diameter. Since the burner is at the center of the proposed hole, it has to be brought out to the designated radius point. It is lit or otherwise put in operation and then cuts its way out from the center. The process of bringing the burner from the center to the end of the radius is produced by operation of the spindle turning and swinging the links so the carriage will be moved out, and the burner will reach the proper point. The bracket 20 secured rigidly to the spindle is turned until it hits the marker. The bracket can move no further on the indicating plate, because it is stopped by this marker. The spindle however continues to turn and moves the gauge marker, frame, rails, carriage and burner around with it. Since the burner is at the "2" diameter setting, it cuts through the work plate and makes a "2" diameter hole in it. The angles or degrees marked off on the indicating plate serve to enable the operator to get the desirable diameter for the cutting to be done by the burner. The various other figures in the diagrams show the sequence of operation of the parts. The reference to diagrams and the previous description of operations serve to elucidate the functions in detail and are both given to clarify the construction and enable one skilled in the art to understand the features of this invention.

When desired to bevel the edge of the hole after it has been cut, the torch is turned until the pointer 10 corresponds with the proper bevel and the arrow points to the desired angle required set out on indicator 8. The crank 26 is turned and the burner proceeds in the same arcuate manner in which it travelled at the time the hole was cut in the plate.

While but one form of the invention is shown in the drawings it is not desired to limit this application for patent to such construction or in any other way otherwise than limited by the principles of the invention and the scope of the appended claims.

Having thus described the invention what is claimed is:

1. In a device for moving a torch along a predetermined geometrical path, the combination of a supporting frame, a holder rotatably mounted in the frame and having angular indicating means thereon to show the position of the torch, said holder supporting at one end a rotatable frame, a carriage reciprocably mounted in the rotatable frame and rotatable therewith, a spindle centrally and rotatably mounted in the holder, link means pivotally connected at opposite ends thereof to said spindle and said carriage, a stop adjustably mounted on the spindle for limiting the movement of the carriage on said rotatable frame, an adjustable bumper on the holder engageable with said stop for rotating the frame in predetermined relation to the spindle, a torch holder carried by the carriage and operating therewith, and means for rotating the spindle.

2. In a device for moving a torch along a predetermined geometrical path, the combination of a supporting frame, a holder rotatably mounted in the frame and having angular indicating means thereon to show the position of the torch, said holder supporting at one end a rotatable frame, a carriage reciprocably mounted in the rotatable frame and rotatable therewith, a spindle centrally and rotatably mounted in the holder, link means pivotally connected at opposite ends thereof to said spindle and said carriage, a stop adjustably mounted on the spindle for limiting the movement of the carriage on said rotatable frame, an adjustable bumper on the holder engageable with said stop for rotating the frame in predetermined relation to the spindle, an adjustable torch holder for cutting angularly and at varying distances carried by the carriage and operating therewith, and means for operating the spindle.

JOHN T. STONE.